June 2, 1959 M. JAUCH 2,889,190

RECORDING CLOCK

Filed April 23, 1957 3 Sheets-Sheet 1

INVENTOR.
MARTIN JAUCH

BY James A. Eisenman

ATTORNEY

June 2, 1959 M. JAUCH 2,889,190

RECORDING CLOCK

Filed April 23, 1957 3 Sheets-Sheet 2

INVENTOR.
MARTIN JAUCH
BY James A. Eisenman
ATTORNEY

June 2, 1959 M. JAUCH 2,889,190

RECORDING CLOCK

Filed April 23, 1957 3 Sheets-Sheet 3

INVENTOR.
MARTIN JAUCH

BY James Q. Eisenman

ATTORNEY

United States Patent Office 2,889,190
Patented June 2, 1959

2,889,190

RECORDING CLOCK

Martin Jauch, Park Ridge, Ill., assignor to Detex Watchclock Corporation, New York, N.Y., a corporation of Delaware Application April 23, 1957, Serial No. 654,543

9 Claims. (Cl. 346—58)

This invention relates to recording clock systems and, more particularly, to recording clock systems of improved, simplified design, adapted to be used, for example, by watchmen covering a prescribed tour of duty.

In the watchman's clock art, two general types of recording clocks are in use at the present time. In one type, the clockwork continuously drives the record paper, which is preferably calibrated as a function of time, so that the time at which any given registration was made can be read off in the manner of a graph. In the other type, the clockwork drives time wheels which print the time on uncalibrated paper which is moved forward a fixed amount only when a registration is made. Each time registration is usually accompanied by a station registration for purposes of correlation. In those units in which time wheels print the time of each actuation, the time impressions are, as a practical matter, entered in a straight column along the record paper, which is usually in tape form. The impressions following one after the other in a column, reading of the record is taxing, and omitted stations are often not detected. However, in those clocks in which the record paper is driven by the clockwork, it is practical to offset the impressions laterally as well as axially. This effects record pattern lines across the paper which are easily read at a glance for omitted stations, and it results in more efficient utilization of the tape area without loss of legibility. However, a rather heavy load is imposed on the clockwork so that the record paper supply must be limited using even the most powerful clockwork.

In accordance with the present invention, there is provided a recording clock which can carry large amounts of record paper and which at the same time provides a record pattern on the paper which is more easily read even than the patterns of those units in which the clockwork drives the paper. The record pattern achieved in accordance with the present invention lends itself either to efficient sight reading or to mechanical reading, any omitted station in the watchman's tour being discernible at a glance. Also, the invention lends itself to physical separation of the recording and time telling components of a recording clock system, as might be desirable for certain applications.

A representative embodiment of the invention from which the above and other features thereof will be readily apparent is described below, having reference to the accompanying drawings in which.

Figure 1:
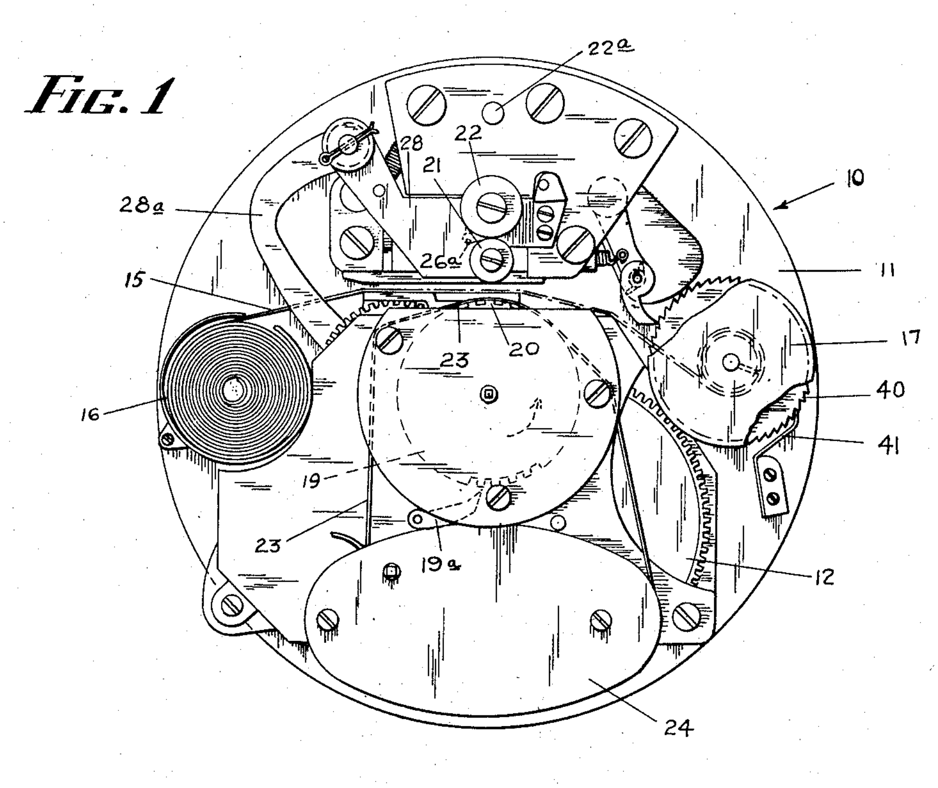
Figure 1 is a view of the back of a watchman's recording clock with the casing removed.
Figure 2:
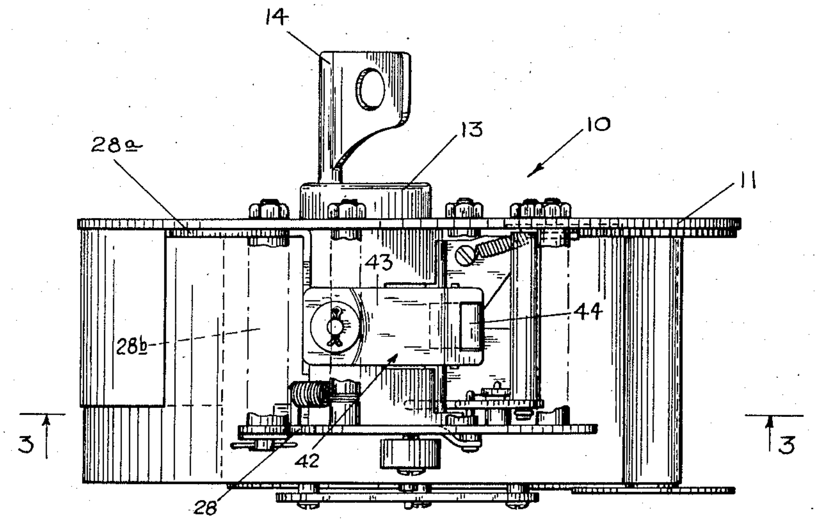
Figure 2 is a top view of the clock showing a recording key inserted in the key house of the clock.

Referring to the drawings, the invention is illustrated as embodied in a recording clock 10 shown removed from its outer casing and carrying pouch. The clock includes a frame 11 carrying a clockwork, only a portion of which, identified by the numeral 12, is visible in the drawing, a key house 13 in which the several station keys 14 are inserted, record means in the form, for example, of a long tape 15 movable between a supply source 16 and a take-up spool 17, and time printing means 19 which can take the form of conventional time printing wheels. The time wheels 19 include raised printing characters 20 against which the record means 15 is forced by movable back-up rolls 21 and 22, with an inked ribbon 23 movable between supply and take-up reel means 24 passing between the time characters 20 and the adjacent recording tape 15.

Figure 8:
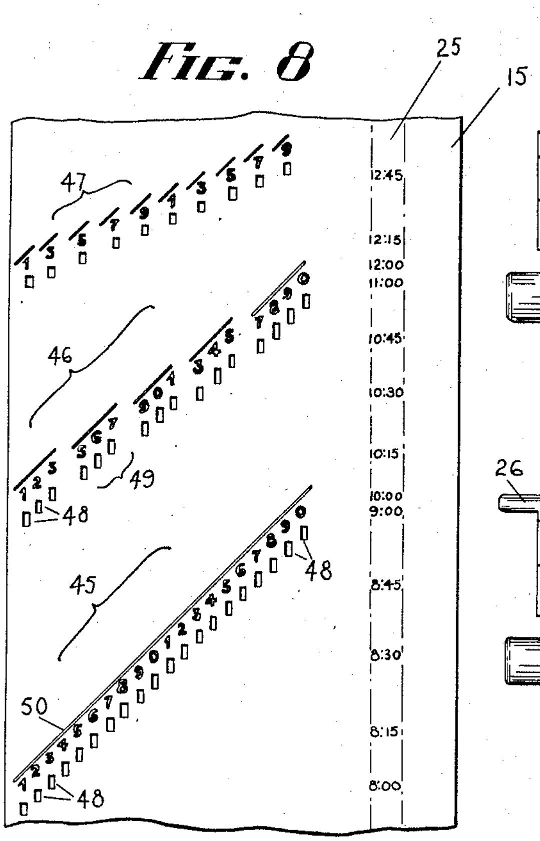
Figure 8 is a face view of a short section of the record tape of the recording clock showing the results of both complete and incomplete tours.

The time printing wheels 19 are driven by the clockwork 12 in a conventional manner to prevent the time wheels in various relative positions to record the time, in the manner, for example, illustrated in the time column 25 of Figure 8. The inked ribbon 23 is preferably moved back and forth past the printing area in conventional step motions in response to the printing action, in the manner, for example, of a conventional typewriter ribbon. The inked ribbon moves either immediately before or after a printing impression has been made in order to prevent blurring. Also to prevent blurring, the time wheels are indexed backward (if necessary) to present full characters to the tape and are then immobilized. This is accomplished by a camming pawl **19*a* which swings into a saw tooth wheel coupled to the time wheels. The pawl 19*a* is actuated by a time wheel line-up lever 28*a*** which is moved every time a time print is made, as described below.

The time wheel means do not move laterally relative to the tape 15. The impressions made thereby appear, therefore, in a straight time line 25 along the length of the tape, as illustrated by Figure 8. Time impressions are not made at each station but are rather made only at selected stations, such, for example, as the first and last stations in a given tour and, if desired, at a few of the intermediate stations if the tour is extensive or if a particular station is critical.

Figure 6B:
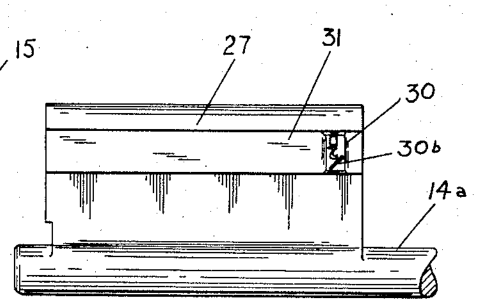
Figure 6B is a view of the working end of a recording key of the type shown in Figure 6A, illustrating the position on the key of indicia corresponding to a different station.
Figure 6C:
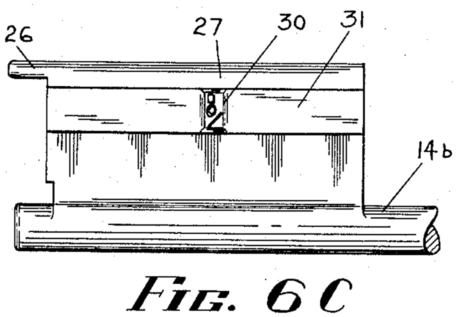
Figure 6C is a view similar to Figure 6B showing the record indicia in a position corresponding to yet another station.

In order to actuate the time printing mechanism, those station keys which correspond to the stations at which time is to be recorded include an actuating lug 26 which can be carried, for example, on a shank extension 27 of the key. In the illustrated arrangement, the station keys 14 and **14*b* of Figures 6A and 6C, respectively, correspond to time recording stations, and therefore include the actuating lug 26, whereas the key 14*a* of Figure 6B is not a time recording station, and therefore includes no lug. With the key 14 inserted in the key house 13, the lug 26 engages a recess 26*a* in a pivotally mounted carrier plate 28 adapted to be swung downwardly as viewed in Figure 1. The plate 28 carries the back-up roll 21 downwardly against the tape 15, forcing it against the then adjacent time type character 20 to record a time impression. The plate 28 also drives the time wheel line-up lever 28*a* through a rock shaft 28*b*. If for any reason it is desired to provide for an independent time actuation, i.e. without a station actuation, a separate key house (not shown) can be provided at the back of the clock which guides the tip of the key shank 29 into a recess 22*a* so that the key can be turned to swing the shank extension 27 past the roller 22, thereby to drive the plate 28 downward to cause the back-up roller 21** to engage the paper to form an impression. Normally, this mode of actuation would be prevented by sealing off the second key house.

Figure 6A:
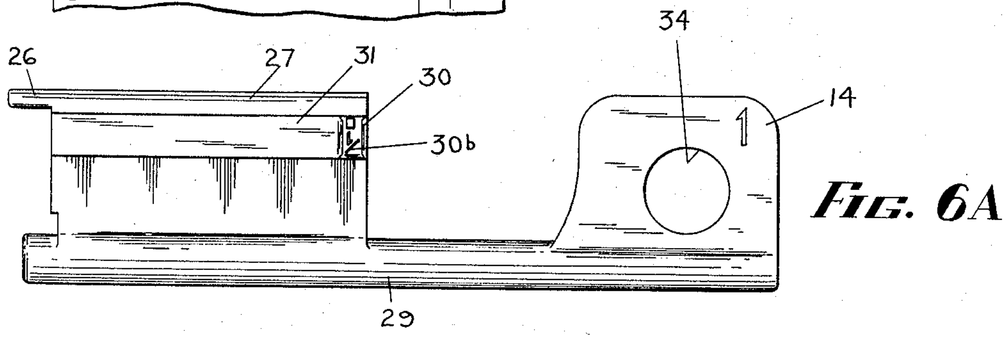
Figure 6A is a side view in enlarged scale of a record key of the type adapted to be secured to a station along the watchman's tour.
Figure 7:
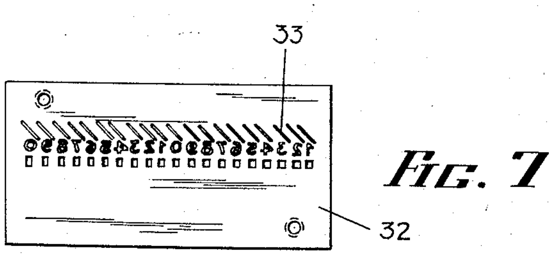
Figure 7 is a plan view of an embossing character plate including recessed indicia corresponding to those of all of the station keys of a given tour.

Referring to Figure 6A, the shank extension 27 which turns with the shank 29 of the key 14 carries embossing means 30 in the form of a type character secured on a rib 31 at a position corresponding to its particular station. The embossing character 30 for the first station, for example, is permanently secured on the rib 31 adjacent its right-hand end as viewed in Figure 6A, whereas the character corresponding to the last station of the tour (not illustrated) is permanently secured at the left-hand end of the rib 31. The embossing characters of the intermediate stations are correspondingly secured intermediate the rib ends in a predetermined pattern. As described below, each successive character can be positioned on its particular key quite close to the positions of the next adjacent characters on their corresponding keys. A representative positioning of the several characters is illustrated by Figure 7, which shows a die plate 32 (in Figures 3 and 4 the die plate is shown mounted in the clock) which is formed with a sequence of mirror-image, recessed characters 33 corresponding, respectively, to the type characters 30 carried by the keys. The plate 32 is mounted in the clock beneath the record tape 15 and extends across the width of the embossing area of the tape, so that, with any given key 14 inserted in the key house 13, its type character 30 will find a mating character 33, thereby to form a deeply embossed impression in the tape.

Figures 3, 4:
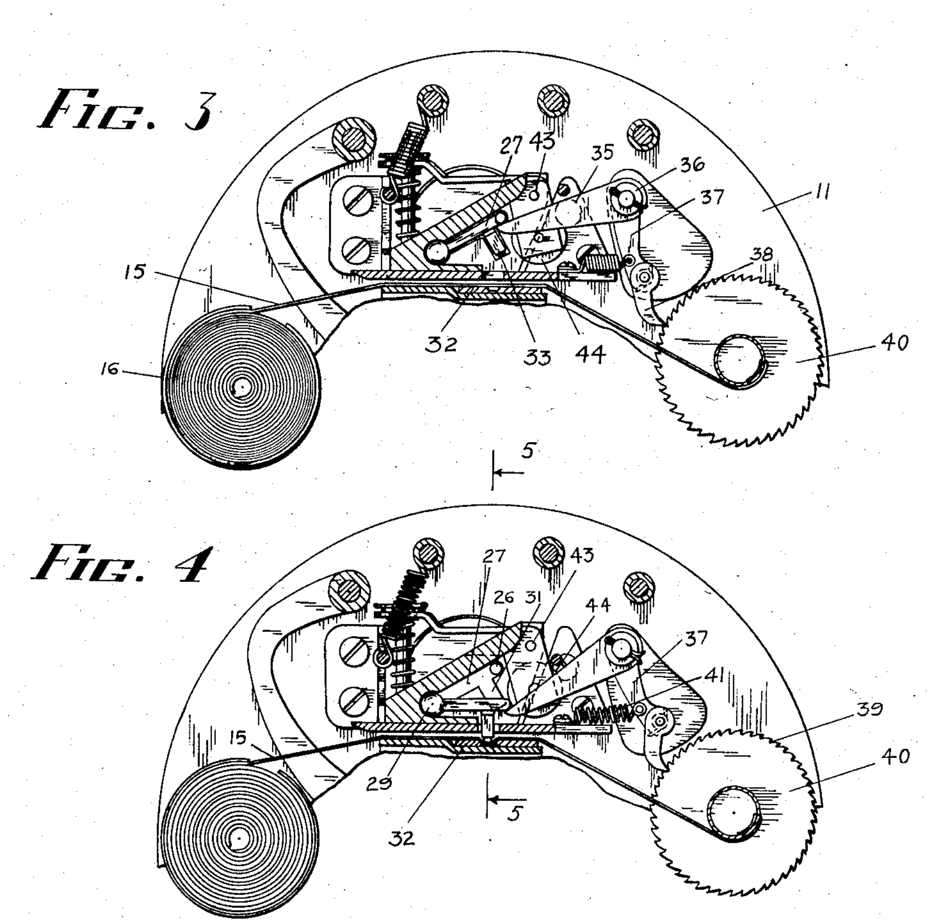
Figure 3 is a fragmentary view in vertical section taken on the line 3—3 of Figure 2.
Figure 4 is a view corresponding to Figure 3 but showing a station key in the act of embossing the record tape.
Figure 5:
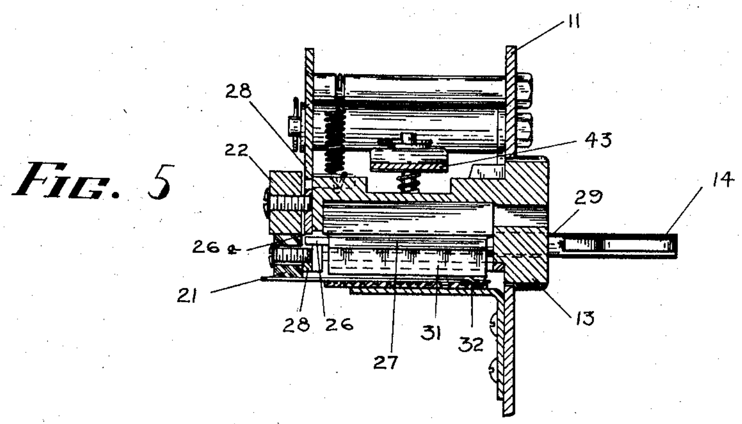
Figure 5 is a fragmentary view in transverse section taken on the line 5—5 of Figure 4 looking in the direction of the arrows.

In operation, assuming a series of station keys 14, **14*a*, 14*b*, etc. are permanently mounted at the several stations throughout a building constituting the watchman's tour, each key preferably being secured at its station by means of a well anchored chain or pivot bar passing through a hole 34 in the base of the key, the watchman begins his tour by carrying his clock to the first station and causing the key 14 to be forced into the key house 13 of the clock. Suitable means such as a detent or sounding device (not shown) are conventionally provided in such clocks as an indication to the watchman that the key is driven home. The watchman then turns the key in the clock, or the clock on the key, as the case may be, causing the type character 30 to be swung downwardly against the tape 15 and into the mating character on the plate 32, as best shown in Figures 3 and 4. This action embosses the character corresponding to that station on the tape. The key is then rotated in a counterclockwise direction, as viewed in Figures 3 and 4, to disengage the mated dies. The latter motion causes the take-up reel 17 to be rotated through a fixed increment by means including a swinging lever 35 engaged by the shank extension 27 of the key to be swung downwardly about a rock shaft 36. A second lever arm 37, which turns with the rock shaft 36 (also in a downward direction as viewed in Figures 3 and 4), carries at its free end a pivoted ratchet pawl 38 spring biased in the direction of ratchet teeth 39 of a ratchet wheel 40. When the key is returned to its initial position as shown in Figure 3, after making an impression, the pawl 38 drives the ratchet wheel 40 in a counterclockwise direction, this motion being effected by a stressed tension spring 41 connected between the frame of the clock and the lever arm 37. The position of the ratchet wheel 40 is maintained by a locking pawl 41** in the form of a leaf spring secured to the frame of the clock. In this fashion, after each impression is made on the tape, the tape is indexed forwardly in position to receive the next impression. In certain cases it is preferable that the ratchet mechanism work directly on the tape, rather than on a take-up reel. In such case the recorded portion of the tape can simply be forced, by the ratchet means, into a cylindrical storage chamber from which it can be readily removed as desired even though there still remains a supply of unused tape in the supply source. Re-threading of the tape is not required, for the severed end is simply forced into the emptied storage chamber to begin a new section.

To enable the watchman to know that he has made an impression, conventional overcentering or detent means 42 are provided, including a spring-biased pivot arm 43, in the free end of which is journaled a roller 44, past which the outer edge of the plate 27 of the key 14 must be forced. The key must, in order to move, force the roller out of its way, after which the roller snaps to its original position on the other side of the key, thus forcing the key automatically against the record tape.

Each successive station results in another impression on the tape in the numerical order indicated and, the relative lateral spacing of each of the characters as well as the incremental advance of the tape being predetermined, a predetermined record pattern having component directions both longitudinally and transversely of the tape results. In the illustrated embodiment the pattern is in the form of a diagonal line across the face of the tape, as indicated generally by the numeral 45. In the event the watchman misses one or more stations in his tour, a broken line results, as indicated at 46. In this pattern, stations 4, 8, 2 and 6 were missed and a corresponding number of breaks appear conspicuously in the line. It is clearly evident at a glance that the tour was incomplete. A tour in which, as an example, all even numbered stations were missed is illustrated at 47. In each case, the start and conclusion of the tour, that is the first and last impressions, are accompanied by an automatically recorded time impression due to the action of the special lug 26 on those particular station keys. Several intermediate stations are also illustrated as including time impressions, as can be accomplished to suit particular needs.

The recorded information enables the reader to know exactly when the tour began and ended, and enables him to approximate with considerable accuracy when each of the intermediate stations was visited by the watchman, even though a time impression was not made at each station. The distance between stations in the tour being known, it can be estimated with considerable accuracy when each station for which a time impression was not made was visited. Time impressions could, of course, be made at each station, although this would necessitate spreading out the longitudinal axis of the tape in order to prevent overlapping of time impressions. A considerable saving in tape is effected by minimizing the longitudinal movement of the tape for each record and, for most applications, an adequate record of the watchman's tour is furnished omitting many or, in some cases, all of the intermediate time impressions. It will be understood, however, that in the event it is desired to make a time impression at every station, it would be possible to dispense with the lug 26 on the special station keys 14 and **14*b* and modify the clock to include a driving coupling between, for example, the lever 35 of the ratchet mechanism and the pivotally mounted carrier plate 28**.

It will be understood that the station character impressions as included in the patterns 45, 46 and 47 of Figure 8 can take the form of numbers (as shown), letters, or other code indicia. Also, these impressions can, if desired, be printed rather than embossed. Embossing the characters, however, lends itself readily to the inclusion of perforations 48, so that the finished tape can be read automatically, as by a conventional perforated tape reading device. Such device can take the form of a simple continuity reader, in which brushes fall into each perforation to complete a series circuit to indicate a complete tour. In the event of one or more missed stations, such, for example, as the stations 4, 8, 2 and 6 of the pattern 46 of Figure 8, perforation gaps would appear in the spaces indicated by the numeral 49, and an open circuit would result, triggering, for example, a bell or means to mark conspicuously that point of the tape.

Sight reading of the tape pattern can be improved by including with each station character a diagonal line-embossing or printing portion 30*b*, the lines being so arranged that they overlap each other to form a solid, continuous line 50, as shown in the pattern 45 of Figure 8. Breaks in this continuous line, such as indicated by the numeral 51 in the pattern 46, stand out even more clearly than the omitted station character. The line indicia can be used either with or without the station indicia, as can the perforations 48, although a calibrated reader would in some cases be required to indicate exactly which station had been missed in the tour. Such reader can take the form of a transparent plate beneath which the tape would be passed for reading and which would be calibrated transversely and longitudinally in the manner of pattern 45 to indicate the stations in terms of numbers. It is also possible to make use of the continuous line in an automatic reader as by perforating out an entire line or by printing with conductive ink, the line then being detected for continuity between its ends. In either of the latter cases, automatic reading can, of course, be accomplished by means of two electrical contact brushes arranged to engage opposite ends of the pattern.

The present invention also lends itself readily to recording clock devices in which the clockwork is not housed in the portable unit, but is rather housed at one or more of the stations. Thus, for example, it is possible to convey time information from a clock outside of the portable unit by conventional time printing wheels such as the wheels 19 or by means such as shown in U.S. Patent No. 2,119,637. In all cases in which the timing mechanism is separated from the recording unit, it will be understood that correlation of a particular station with any given time impression is brought about by making, concurrently with each time impression, a station impression from a particular recording key 14. The two impressions occur side by side and the tape is indexed forward one increment when either or both impressions are made. An isolated time impression, therefore, should be indicative of illicit action by the watchman.

In all cases, the casing (not shown) for the recording clock should, in accordance with present-day practice in the art of watchclocks, be locked against tampering and furnished with means to mark the tape permanently when the casing is opened.

It will be understood, therefore, that the present invention can take various forms and shapes, and that it should not be regarded as limited, except as defined by the following claims.

I claim:

1. Recording clock apparatus for recording and timing a tour of inspection of a series of stations, a portable unit to be carried on the tour, record means movably supported in the unit to receive markings representative of the respective stations, a series of marking devices at the respective stations to mark the record means in the portable unit, guide means in the portable unit to receive successively the several marking devices, first actuating means adjacent the guide means to move the record means in the unit in response to each marking operation, complementary means in the unit and at the respective marking devices to effect markings on the record means which are successively laterally offset with respect to the direction of movement of the record means in the unit, whereby the markings of each complete tour define a uniform pattern on the record means which is at an angle to the direction of movement thereof, and whereby one or more omitted station markings establishes a pronounced break in the pattern of any given tour, means to record time on the record means at points spaced from the station markings, and second actuating means in the portable unit adapted to be actuated by selected marking devices concurrently with the entry of station markings, whereby the entries are recorded automatically at predetermined stations supplemental to the recorded pattern of the tour.

2. Recording clock apparatus as set forth in claim 1, said record means comprising an elongated tape movable in the unit between storage and supply spaces, said complementary means of the portable unit and of the respective marking devices of the stations effecting a marking pattern for each complete tour in the form of a straight diagonal across the width of the tape.

3. Recording clock apparatus as set forth in claim 2, said means to record time being positioned to mark the time record along the margin of the tape precisely laterally opposite the markings of the station for which the time entry is made.

4. Recording clock apparatus as set forth in claim 2, said storage space for the tape comprising a generally circular chamber into which the tape is forced to wind upon itself.

5. Recording clock apparatus as set forth in claim 1, said marking devices comprising key members insertable into the portable unit and carrying, respectively, means to form indicia representative of a particular station.

6. Recording clock apparatus as set forth in claim 5, each key member carrying means to form pattern markings in the record means in addition to the indicia representing a particular station.

7. Recording clock apparatus as set forth in claim 6, said pattern marking means on the keys comprising line elements to form a continuous, unbroken, straight line of the record means representative of a complete tour, a tour having an omitted station, thereby being represented by two or more parallel, laterally spaced lines of shorter length than that representing a complete tour.

8. Recording clock apparatus as set forth in claim 6, said pattern marking means on the key members including die means to perforate the record means.

9. Recording clock apparatus as set forth in claim 2, said marking devices comprising keys having elongated shank portions and said guide means comprising a key receiving housing in the portable unit having said first and second actuating means disposed in spaced apart relationship along the length thereof, each of said keys having a common shank portion to engage the first actuating means and selected key shanks having a supplemental portion to engage the second actuating means, clock means mounted within the portable unit, the recording wheels driven by the clock means and including printing indicia thereon, and backup means complementary to the time wheels and connected to said second actuating means to press the record means against the time wheels.

References Cited in the file of this patent

UNITED STATES PATENTS

| | | |
|---|---|---|
| 934,038 | Burk | Sept. 14, 1909 |
| 1,167,902 | Kennicott | Jan. 11, 1916 |
| 1,699,161 | Rutt | Jan. 15, 1929 |
| 2,119,637 | Kennedy et al. | June 7, 1938 |
| 2,307,128 | Harrison | Jan. 5, 1943 |